United States Patent
Witte

(10) Patent No.: US 7,810,795 B2
(45) Date of Patent: Oct. 12, 2010

(54) METHOD AND DEVICE FOR THE FOAMING OF AT LEAST ONE LIQUID OR VISCOUS SUBSTANCE

(75) Inventor: Ulrich Witte, Essen/Oldenburg (DE)

(73) Assignee: beba Mischtechnik GmbH, Essen/Oldenburg (DE)

( * ) Notice: Subject to any disclaimer, the term of this patent is extended or adjusted under 35 U.S.C. 154(b) by 984 days.

(21) Appl. No.: 11/413,676

(22) Filed: Apr. 28, 2006

(65) Prior Publication Data

US 2006/0273474 A1    Dec. 7, 2006

(51) Int. Cl.
*B01F 3/04* (2006.01)
(52) U.S. Cl. .................................. 261/91; 261/DIG. 26
(58) Field of Classification Search .................. 261/91, 261/92, DIG. 26
See application file for complete search history.

(56) References Cited

U.S. PATENT DOCUMENTS

| | | | | |
|---|---|---|---|---|
| 2,261,257 | A * | 11/1941 | Kiesskalt et al. ............... | 366/79 |
| 3,234,962 | A * | 2/1966 | Williamson ............ | 137/565.11 |
| 3,353,550 | A * | 11/1967 | Williamson et al. .......... | 137/114 |
| 3,620,231 | A * | 11/1971 | Miller .......................... | 134/15 |
| 3,684,458 | A * | 8/1972 | McCammon et al. ........ | 422/135 |
| 3,735,961 | A | 5/1973 | Taylor | |
| 3,846,515 | A * | 11/1974 | Williamson ................. | 261/18.3 |
| 4,000,086 | A | 12/1976 | Stoev et al. | |
| 4,101,384 | A * | 7/1978 | Faust et al. ............... | 435/298.1 |
| 6,217,009 | B1 * | 4/2001 | Rowe ......................... | 261/78.2 |
| 6,332,704 | B1 | 12/2001 | Gasser et al. | |
| 6,484,568 | B1 | 11/2002 | Griffith | |
| 2002/0089074 | A1 * | 7/2002 | Holl ............................. | 261/92 |
| 2004/0186425 | A1 | 9/2004 | Schneider | |
| 2004/0222536 | A1 * | 11/2004 | Holl ............................. | 261/83 |

FOREIGN PATENT DOCUMENTS

| | | |
|---|---|---|
| DE | 93 08 866 U1 | 12/1994 |
| DE | 197 10 899 A1 | 10/1998 |
| DE | 198 06 020 A1 | 8/1999 |
| FR | 2 857 574 A | 1/2005 |

OTHER PUBLICATIONS

English Translation of German Office Action dated Mar. 15, 2006.

* cited by examiner

*Primary Examiner*—Scott Bushey
(74) *Attorney, Agent, or Firm*—Collard & Roe, P.C.

(57) ABSTRACT

In a method for the foaming of at least one liquid or viscous substance, provision is made such that the substance is introduced into at least one closed chamber and that the chamber is set into an oscillatory motion during the introduction. A device for the foaming of at least one liquid or viscous substance, with a mixing apparatus, preferably for the performance of the method, is characterized in that a drive device for generating an oscillatory motion is arranged on the mixing apparatus. With the method and the device, the possibility arises, to particular advantage, of foaming a liquid or viscous substance without, for example, a rotating stirring tool heating the substance to be foamed or a stirring tool being present that projects into the mixing apparatus.

13 Claims, 4 Drawing Sheets

METHOD AND DEVICE FOR THE FOAMING OF AT LEAST ONE LIQUID OR VISCOUS SUBSTANCE

Figure 1:
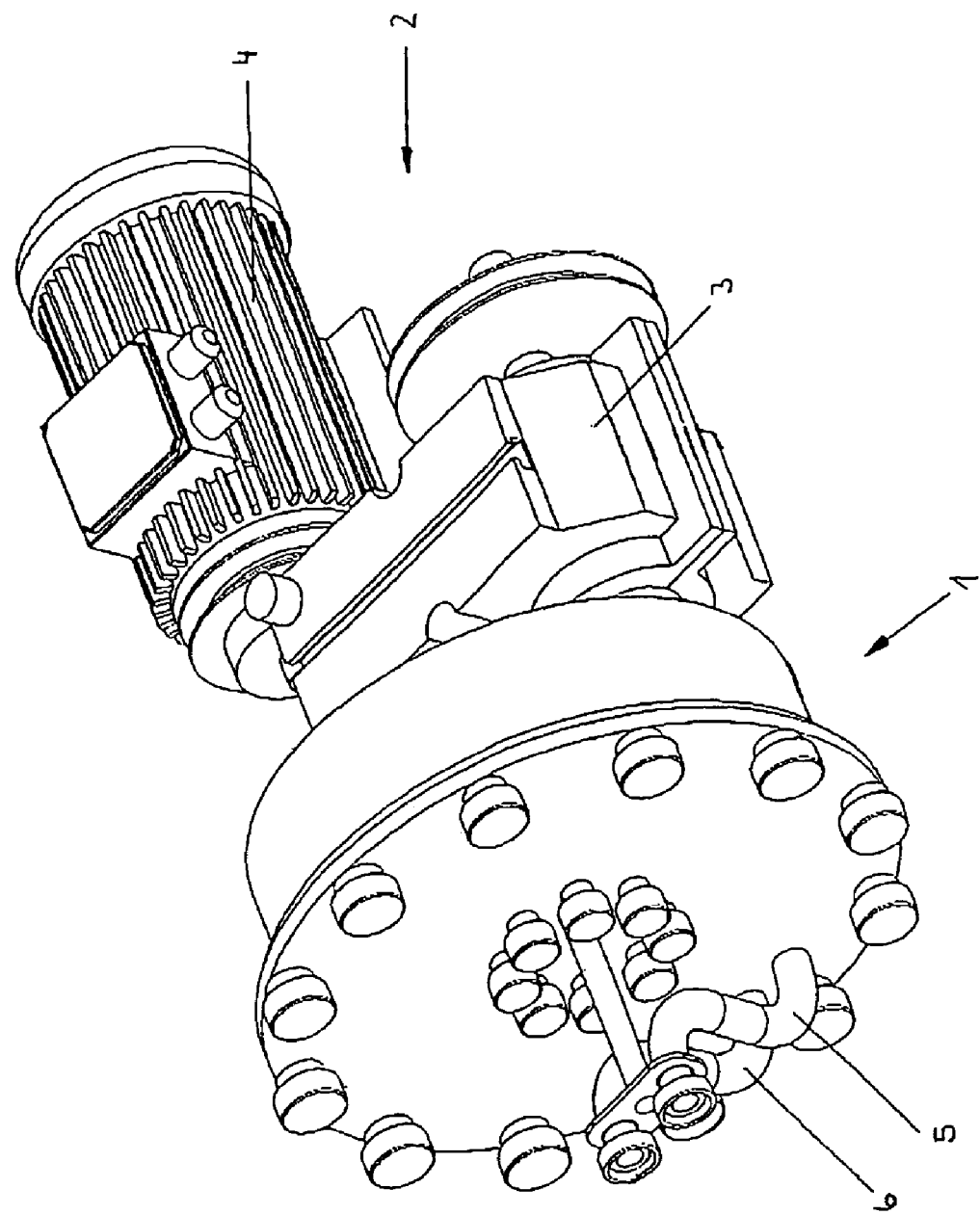

The invention relates to a method for the foaming of at least one liquid or viscous substance. Furthermore, the invention relates to a device for the foaming of at least one liquid or viscous substance with a mixing apparatus.

Methods and devices of known design, in particular for the industrial production of foamed substances, operate with the use of a stirring apparatus. For this purpose, the liquid or viscous substance or the mixture is introduced into a container and then foamed with the aid of a stirring apparatus. For this purpose, at least one stirring apparatus, in particular, projects into the container provided with the substance to be foamed. During the foaming process, the liquid or viscous substance is preferably passed by two stirring tools rotating in opposite directions. Once the foam has reached its desired consistency, it is removed from the container and the latter is filled with the liquid or viscous substance or substance mixture for a new foaming process.

With methods of the type mentioned at the outset, it is essential in the case of the foaming of substances that are used in the foodstuffs industry that the container is constantly cooled during the foaming process. This is especially necessary in the case where cream is being foamed, since the latter would otherwise undergo the decomposition process prematurely. Moreover, there is the problem with the apparatus used for this that the rotatably mounted shafts of the stirring apparatus, particularly in the case of foaming processes in the foodstuffs industry, have to be provided with a special seal. This eliminates possible contamination of the substance to the foamed. The seals have to be replaced at regular intervals in order to guarantee a reliable production process. On the one hand, this means a high maintenance intensity, and associated costs are thereby incurred, and on the other hand the utilisation of the machine and thus its efficiency is reduced due to the maintenance intervals that regularly have to take place.

The process-related problem underlying the invention is to provide a method of the type described at the outset, wherein cooling of the substance to be foamed during the foaming is not necessary. Furthermore, the device-related problem underlying the invention is to provide a device in which no rotating parts project into a container or a chamber.

According to the invention, the solution to this problem takes place by means of a method with the features of claim 1 and by means of a device with the features of claim 6. Advantageous developments and configurations of the invention are given in the sub-claims related respectively to these claims.

In a method for the foaming of at least one liquid or viscous substance, provision is made according to the invention such that the substance is introduced into at least one closed chamber and that the chamber is set into an oscillatory motion during the introduction. As a result of the introduction of the substance to be foamed into a closed chamber, it is possible to implement the method according to the invention as a continuous process, since the chamber of the mixing apparatus can already be set into an oscillatory motion during the introduction of the substance into the latter. Compared with the introduction of rotating stirring tools into a container for the foaming of the substance, the oscillation of the closed chamber has the advantage that the mechanical loading during the foaming process of the substance to be foamed proves to be less. Cooling of the substance to be foamed is not therefore necessary and the use of the method according to the invention is very easy to implement, especially in the foodstuffs industry when foaming highly perishable goods. A production process is thus described in which foaming can be carried out without additional cooling and without losses of quality arising as a result.

The substance is foamed by setting the chamber into a oscillatory motion after filling of the substance into the chamber. To advantage, it is not necessary for this purpose for a stirring tool to project into the chamber. On account of its oscillatory motion, the closed chamber itself forms a foaming tool, so that it is possible, with the advantage of a simplified design, to dispense with rotating or otherwise moving components in the interior of the chamber.

To particular advantage, provision is made according to a development of the invention such that the chamber is set into an oscillatory rotational motion. The chamber and in like manner the substance to be foamed experience a rotational motion about the centrepoint of the chamber, whereby this rotational motion is performed only over a predetermined segment of the chamber circumference or over a predetermined number of degrees. From a certain number of oscillatory motions per unit of time, the mass moment of inertia of the substance to be foamed is greater than the frictional forces between the chamber surface and the substance to be foamed, as a result of which a relative motion results between the introduced substance and the surface of the chamber.

According to a development of the invention, foaming elements are moved through the introduced substance as a result of the oscillatory motion, and in particular a gas is thus introduced into the liquid or viscous substance with the application of shearing forces. Gas bubbles, which are each separated from one another by a liquid film, are thereby intended to be generated by the foaming elements. The stability of the foam depends on the size of the introduced gas bubbles into the liquid substance, whereby smaller gas bubbles signify greater stability of the foam.

In order to enable a continuous process sequence, the substance to be foamed is pressed into the chamber with a predetermined excess pressure between 1 bar and 10 bar. The continuity of the method according to the invention is implemented by means of the pressure which is applied to the substance to be introduced into the chamber. It is thus no longer necessary to remove the foam from the container in an independent process step after the production process. The liquid or viscous substance is conveyed into the chamber of the mixing apparatus with the aid of the applied pressure, is foamed with the aid of the foaming elements and the formed foam is at the same time removed from the chamber by the introduced, still liquid substance. After removal of the foam from the chamber, the latter still experiences an additional volume enlargement, since the gas bubbles introduced under pressure into the substance to be foamed expand markedly under ambient conditions. Furthermore, depending on the viscosity of the substance to be foamed, the flow rate of the latter is determined by the applied pressure.

According to a development of invention, provision is made such that the oscillatory motion of the chamber is performed at a frequency from 10 Hz to 25 Hz. As a result of the variability of the predetermined frequency band with which the chamber is moved, there is an optimum adjustment facility to the differing viscosity of the substances or substance mixtures to be foamed and the desired composition and stability of the foam is thus constantly ensured.

With a device for the foaming of at least one liquid or viscous substance, with a mixing apparatus, preferably for the performance of the method described above, for which independent protection is being applied for, provision is made such that a drive device for generating an oscillatory motion is arranged on the mixing apparatus.

The drive device with the mixing apparatus is designed in such a way that the whole mixing apparatus is subjected to an oscillatory motion by the drive device. The advantage of the device according to the invention is based on the fact that no rotating parts are arranged inside the mixing apparatus. The use of sealing elements, which are subjected to considerable load by the rotating parts of the stirring tool, are not therefore required, as a result of which possibly occurring contamination by lubricants from the bearings of a rotating stirring tool can at the same time be eliminated. Moreover, the required maintenance outlay and the associated costs are very low as a result of the very simply designed embodiment of the invention, since no parts introduced from the exterior project into the mixing apparatus.

To particular advantage, provision is made according to a development of the invention such that the drive device for generating an oscillatory rotational motion has a cam gear. By means of the employed cam gear, the oscillatory rotational motion that is advantageous for the production process can very easily be converted from a rotary motion, whereby the rotary motion is preferably produced by an electric motor. At the same time, the shaft of the cam gear, which transmits the oscillatory rotational motion to the mixing apparatus, is only subjected to a torsional load, which has an advantageous effect on the durability and possible uses of the device according to the invention.

In order to implement a continuous foaming process, the mixing apparatus has at least one closed chamber, which has the function of a mixing chamber, whereby at least one foaming element is arranged in the chamber. In addition, the substance or the substance mixture is pressurised, which has the advantage that the continuous introduction of the substance, the continuous further-transport during the foaming and the continuous removal of the foamed substance or substance mixture takes place with the aid of the excess pressure. The foaming process is implemented with foaming elements arranged in the chamber, whereby preferably eight foaming elements are arranged in the chamber in a predetermined arrangement. Depending on the viscosity of the employed substance or substance mixture, up to 24 foaming elements can be used in the chamber of the mixing apparatus.

For this purpose, each foaming element is designed as a blade and has perforations in a predetermined number, shape and size. Each blade is arranged in the chamber in such a way that, shortly after introduction of the substance, contact of the blade with the substance is forced by the oscillatory motion. Each blade has in particular perforations which are specially adapted to the medium to be foamed, in a predetermined number, shape and size. The given viscosity of the substance to be foamed has an influence which essentially has to be taken into account for the shape and size of the perforations to be selected and thus also for the number of possible perforations on the blade. The blades, which preferably have a plate-like design, are provided in particular with perforations in the shape of triangles, rectangles or circular holes. The different shapes of the perforations can be adapted individually to the foaming behaviour of the various substances or substance mixtures. It is also possible to use any other designs of perforations for the foaming, in particular in relation to the shape. In order to achieve corrosion resistance of the blades and to guarantee adequate stability during foaming, a high-alloy steel is used in particular as the material.

According to a development of the invention, provision is made such that the chamber of the mixing apparatus is designed cylindrical. To advantage, this embodiment guarantees a uniform distribution of the occurring centrifugal loading at the shaft of the cam gear. Apart from the torsional loading of the shaft, therefore, no further loading occurs due to a bending moment, and this is advantageous for the characteristic oscillation behaviour of the device.

In order to be able to carry out an optimum arrangement of the foaming elements in the mixing apparatus, the mixing apparatus according to a first alternative has a wheel body, whereby the wheel body is formed by a plurality of foaming elements, which are orientated radially with respect to a common central zone. The wheel body, depending on the predetermined viscosity of the foamed end product, can consist of an arbitrary number of foaming elements. The foaming elements are held by means of two ring elements, which bring about a positioning of the various foaming elements with respect to one another. The formation of the foaming elements into a compact wheel body insertable as a whole into the chamber has the advantage that the wheel body can be assembled and equipped in advance and can thus easily be replaced, which in turn reduces the time that needs to be so spent on setting up.

The mixing apparatus has at least two locking elements to secure the position of the wheel body. The locking elements, which are preferably designed as pins projecting into the mixing chamber, each engage in one of the ring elements of the wheel body and prevent the rotation of the same in the opposite direction and thus a defect of the wheel body during the process taking place continuously.

Furthermore, the mixing apparatus has a partition wall interrupting the annular chamber. The partition wall, which is attached rigidly to the faces of the housing forming the chamber, is preferably used for the implementation of a predetermined flow direction or flow path. The substance to be foamed thus undergoes a defined process sequence, in particular between the entry and the exit into and out of the chamber, as a result of which a homogeneous composition of the end product is always obtained.

According to a second alternative of the invention, provision is made such that the mixing apparatus has a wheel body forming the chamber, whereby the lateral faces of the wheel body, which preferably form the chamber, have an equal number of grooves. In the design of the mixing apparatus, the use of a wheel body has the advantage that the latter, with the aid of a rotary processing method, is a component that is easy to produce from the design standpoint. At the same time, the preferentially desired uniform centrifugal loading of the shaft is achieved by this embodiment. In order to be able to accommodate the blades required for the foaming process on the wheel body of the mixing apparatus, an equal number of grooves are arranged for example on the lateral faces of the wheel body forming the chamber. Depending on the substance to be foamed, up to 24 blades can be inserted into the chamber when the latter is opened. Each individual blade can be very easily inserted and removed by means of the grooves, and the securing of the position of the blades is guaranteed by fitting the lid on the wheel body of the mixing apparatus.

In order to ensure the introduction and removal of the substance or substance mixture into or out of the mixing apparatus, the latter is provided with at least two connections. The use of two connections on the mixing apparatus has the advantage that the foaming process to be performed can be carried out continuously and efficient utilisation of the device is thus guaranteed.

The connections for the introduction and removal of the substance to be foamed are arranged in the case of the first alternative beside one another in an outer wall of the mixing apparatus, whereby one connection is located on one side with respect to the partition wall. A predetermined flow path for the substance to be foamed is thus provided by this assignment of the connections with respect to the partition wall. The intended effect of this is that the substances flow during the foaming process through all the foaming elements distributed on the whole circumference of the chamber, as a result of which an optimum and uniform composition of the end product is obtained.

In the second alternative, provision is made such that the connections are arranged at an angle of approximately 180° to one another on the outer diameter of the wheel body. This also produces an optimum utilisation of the whole available cross-section of the chamber during the foaming process. The connections are preferably arranged above and below on the wheel body, which leads advantageously to a uniform distribution of the substance in the cross-section of the chamber. The substance to be foamed is preferably introduced from below into the chamber, in order that a defined flow rate of the substance to be foamed can be brought about by the pressure that is applied to the substance.

In order to be able to guarantee the prescribed quality features of the substance to be foamed, a rustproof material is used as the material for the mixing apparatus. Especially in the case of substances that are foamed in foodstuffs technology, this guarantees that there is no influence on the quality properties and thus prevents a premature decomposition process of the foams. High-alloy steels are preferably used to form the mixing apparatus, since these achieve high strength values in addition to the advantageous property of resistance to corrosion. The high strength is required especially with process variables such as for example a pressure of 10 bar, since great strains arise especially at the end faces of the mixing apparatus with a possible chamber volume of 5 liters. With certain designs of the mixing apparatuses and with low process variables, however, it is also possible to make use of plastics. In terms of their processing, the latter display special advantages compared with high-alloy steels.

Figure 2:
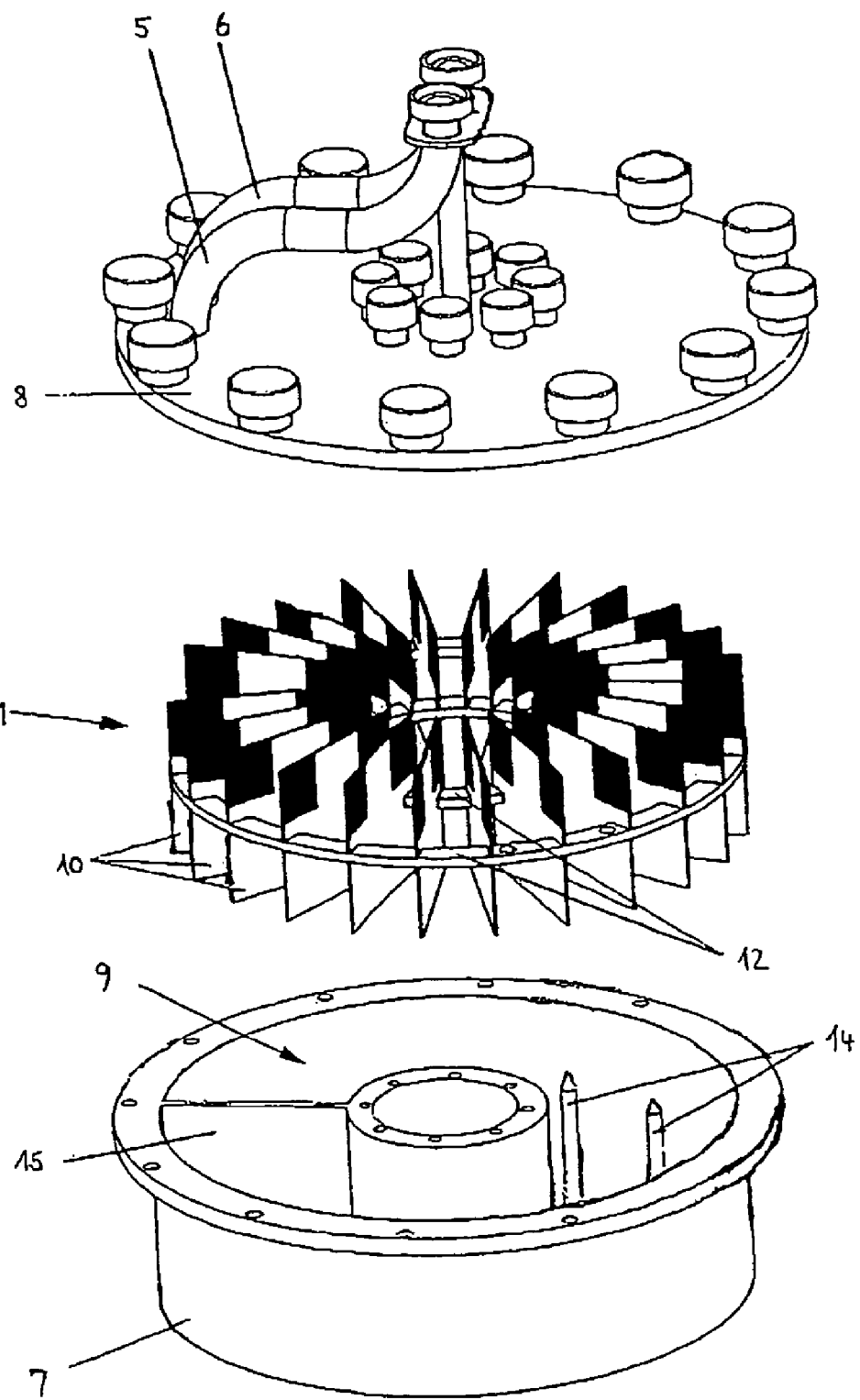
Figure 3:
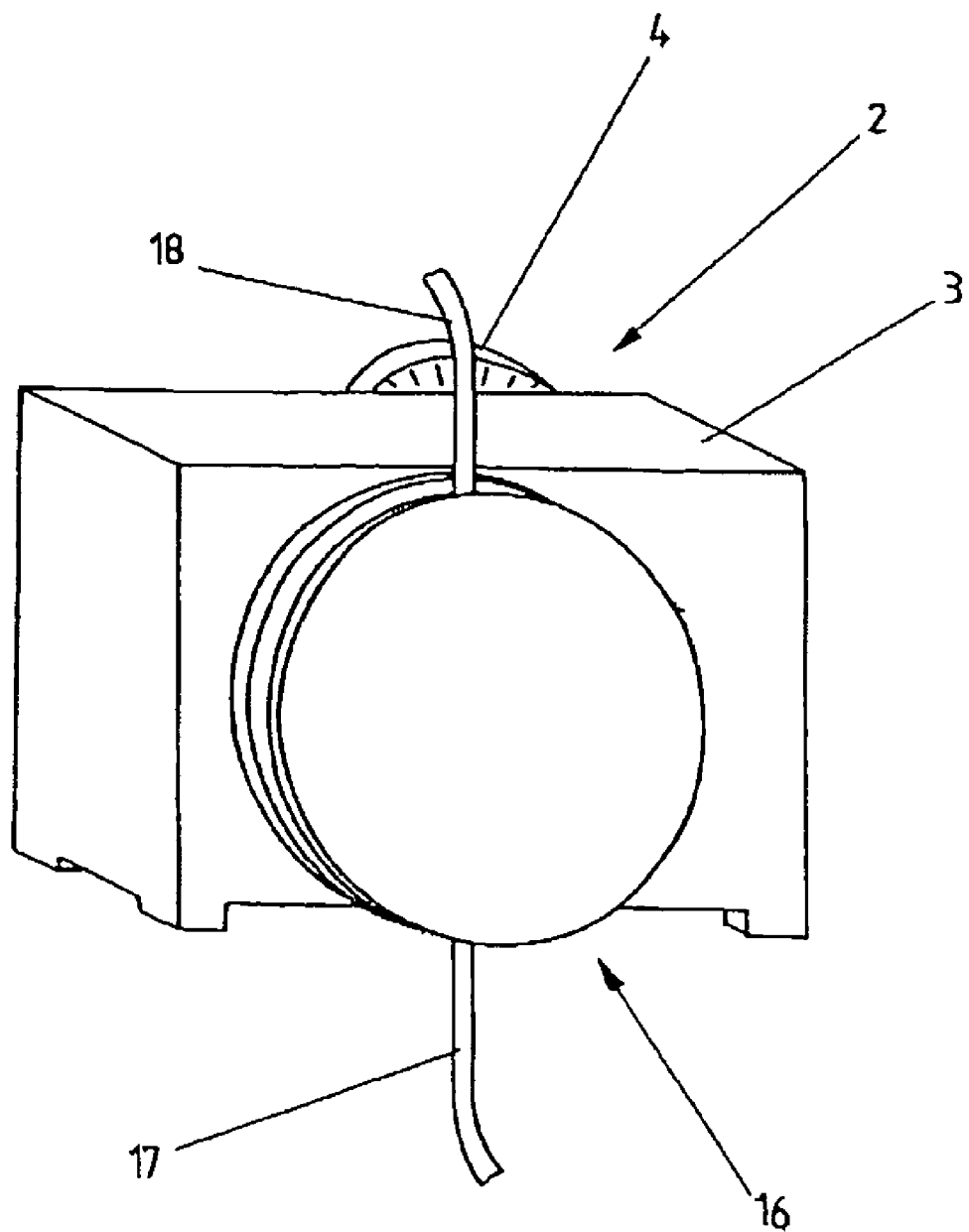
Figure 4:
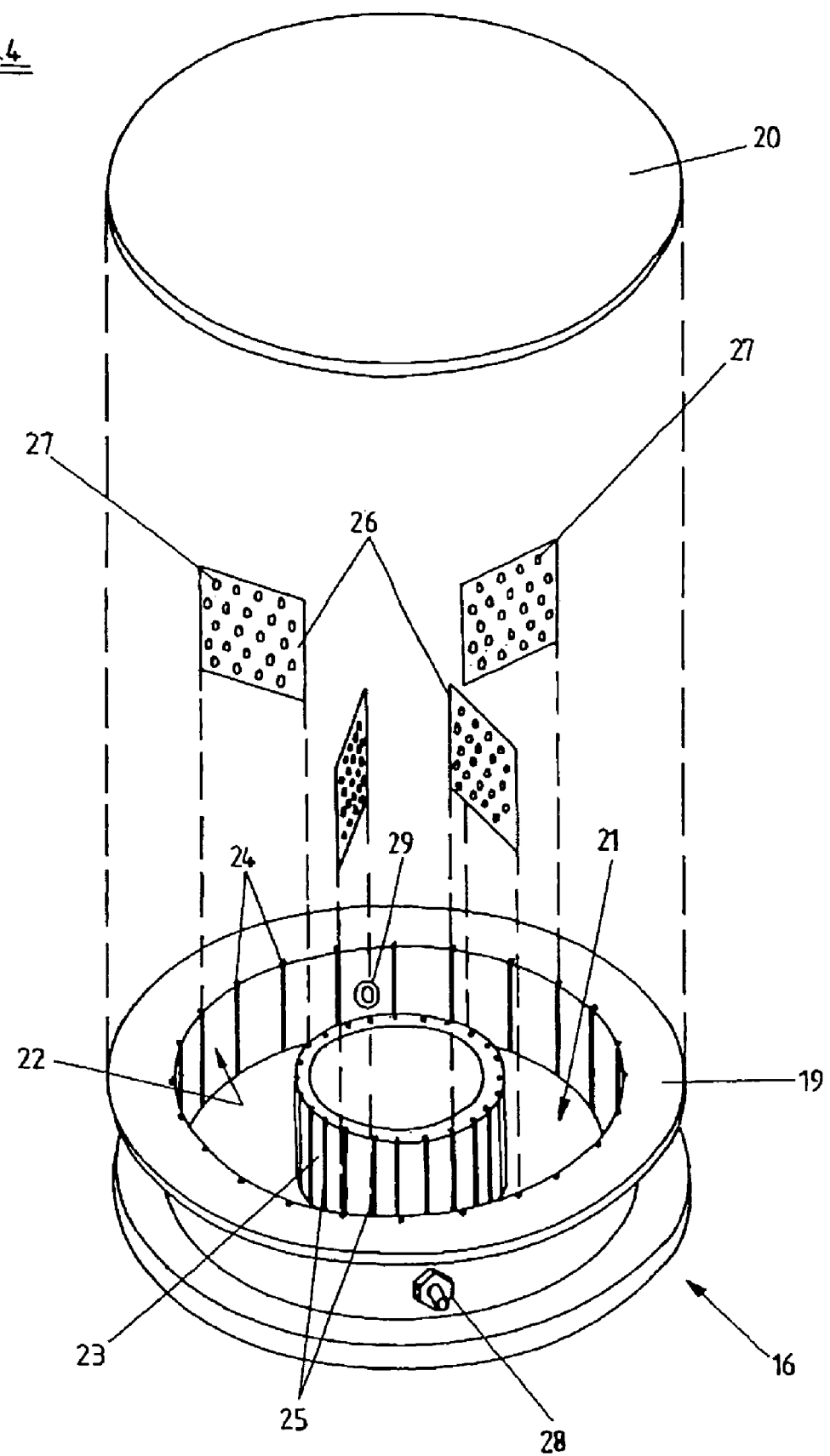

Examples of embodiment of the invention, from which further inventive features emerge, are represented in the drawing. In the figures:

FIG. 1: shows a perspective view of a first example of embodiment of a device according to the invention;

FIG. 2: shows a view of a mixing apparatus of the device according to FIG. 1 in the manner of an exploded view;

FIG. 3: shows a perspective view of a second example of embodiment of the device according to the invention with an alternatively designed mixing apparatus, and FIG. 4: shows a view of the mixing apparatus according to FIG. 3 in the manner of an exploded view.

The mixing apparatus of a device for the foaming of at least one liquid or viscous substance is denoted by 1, whereby mixing apparatus 1 is connected directly to a drive device 2. Drive device 2 is composed of a cam gear 3 and a motor 4 and generates an oscillatory rotational motion of the mixing apparatus 1. During the continuously implemented oscillatory rotational motion, a substance or substance mixture is introduced for the foaming process into mixing apparatus 1 and, respectively, discharged again via connections 5, 6, which are arranged on mixing apparatus 1.

Mixing apparatus 1, as FIG. 2 shows in the manner of an exploded view, is divided into a housing 7 and a lid 8, whereby housing 7 with fitted-on lid 8 forms an annular chamber 9. Arranged in chamber 9 is a wheel body 11 formed from a plurality of foaming elements 10, which are orientated radially with respect to a common centre zone. Foaming elements 10 are designed in particular as blades or paddles and are held in their predetermined positions with the aid of two ring elements 12, which engage via grooves into side regions of a respective foaming element 10. Each foaming element 10 has, related to the viscosity of the substance to be foamed, a predetermined number, shape and size of perforations. In order to be able to achieve a secure position of wheel body 11 in chamber 9, mixing apparatus 1, in particular housing 7, is provided in predetermined regions with a plurality of locking elements 14. For this purpose, locking elements 14 engage respectively in ring elements 12 and thus guarantee the secure position of wheel body 11. Since connections 5, 6 for the introduction and removal of the medium to be foamed are arranged at an angle of approximately 15° to one another on lid 8 of mixing apparatus 1 and the foaming process is to take place over the whole circumference of mixing chamber 9, it is necessary for a partition wall 15 interrupting annular mixing chamber 9 to the present in housing 7. An optimum foaming process is thus guaranteed.

The alternatively designed device, as shown in FIG. 3, is divided into a mixing apparatus 16 and a drive device 2, whereby drive device 2 comprises a cam gear 3 and a motor 4. Mixing apparatus 1 is connected in particular by a shaft (not shown) to cam gear 3 and performs an oscillatory rotational motion during the foaming of a substance or a substance mixture. In order to introduce the substance or substance mixture into mixing apparatus 16 or to remove it again therefrom, two feed lines 17, 18 are mounted on the latter.

FIG. 4 illustrates, particularly in the manner of an exploded view, the structure and the mode of functioning of mixing apparatus 16. Mixing apparatus 16 is composed of wheel body 19 and a lid 20. A mixing chamber 21 arises in the interior of mixing apparatus 16, whereby lateral faces 22, 23 of wheel body 19 involved in the formation of mixing chamber 21 are provided with grooves 24, 25. Each lateral face 22, 23 is provided with up to twenty four grooves 24, 25, as a result of which, depending on the given viscosity of the substance to be foamed, an arbitrary number of foaming elements 26, which are designed as blades or paddles, can be inserted into grooves 24, 25. Foaming elements 26 are provided with a predetermined number, shape and size of perforations 27, also related to the viscosity of the substance to be foamed. Once the substance to be foamed has been introduced via connection 28 into chamber 21, it is pressed by the oscillatory rotational motion through perforations 27 of foaming elements 26. Shearing forces are thus produced on the liquid, so that gas bubbles surrounded by a liquid film arise as a result of the gas introduced into the liquid. After the foaming process, the foam is removed from chamber 21 via connection 29, which lies opposite connection 28 at an angle of approximately 180°.

The invention claimed is:

1. A device for the foaming of at least one liquid or viscous substance, comprising a mixing apparatus having a closed chamber, and a drive device arranged on the mixing apparatus outside the closed chamber for oscillating the closed chamber.

2. The device according to claim 1, wherein the drive device has a cam gear for generating an oscillatory rotational motion.

3. The device according to claim 1, wherein the mixing apparatus has at least one closed chamber, and wherein at least one foaming element is arranged in the chamber.

4. The device according to claim 3, wherein each foaming element is a blade, and wherein each blade has perforations in a predetermined number, shape and size.

5. The device according to claim 3, wherein the chamber of the mixing apparatus is designed cylindrical.

6. The device according to claim 1, wherein the mixing apparatus has a wheel body, and wherein the wheel body is formed from a plurality of foaming elements, which are orientated radially with respect to a common center zone.

7. The device according to claim 6, wherein the mixing apparatus has at least two locking elements for the secure positioning of the wheel body.

8. The device according to claim 1, wherein the mixing apparatus has a partition wall interrupting the closed chamber.

9. The device according to claim 1, wherein the mixing apparatus has a wheel body and wherein lateral faces of the wheel body, which form the chamber, have an equal number of grooves.

10. The device according to claim 8, wherein the mixing apparatus is provided with at least two connections.

11. The device according to claim 10, wherein the connections are arranged beside one another in an outer wall of the mixing apparatus, whereby one connection is located on each side with respect to the partition wall.

12. The device according to claim 10, wherein the connections are arranged at an angle of approximately 180° to one another on an outer diameter of a wheel body of the mixing apparatus.

13. The device according to claim 6, wherein the material for the mixing apparatus is a rustproof material.

* * * * *

UNITED STATES PATENT AND TRADEMARK OFFICE
CERTIFICATE OF CORRECTION

PATENT NO. : 7,810,795 B2 Page 1 of 1
APPLICATION NO. : 11/413676
DATED : October 12, 2010
INVENTOR(S) : Witte It is certified that error appears in the above-identified patent and that said Letters Patent is hereby corrected as shown below:

Cover page, column 1, item [30], please add the Claim of Priority of the Foreign Application Priority data as follows:

-- April. 30, 2005 (DE) ..................... 10 2005 020 263.2 --.

Signed and Sealed this

Twenty-third Day of November, 2010

David J. Kappos
*Director of the United States Patent and Trademark Office*